Sept. 19, 1939.　　　C. G. SERIGHT　　　2,173,487
SENSITIVE INDICATOR
Filed July 20, 1936
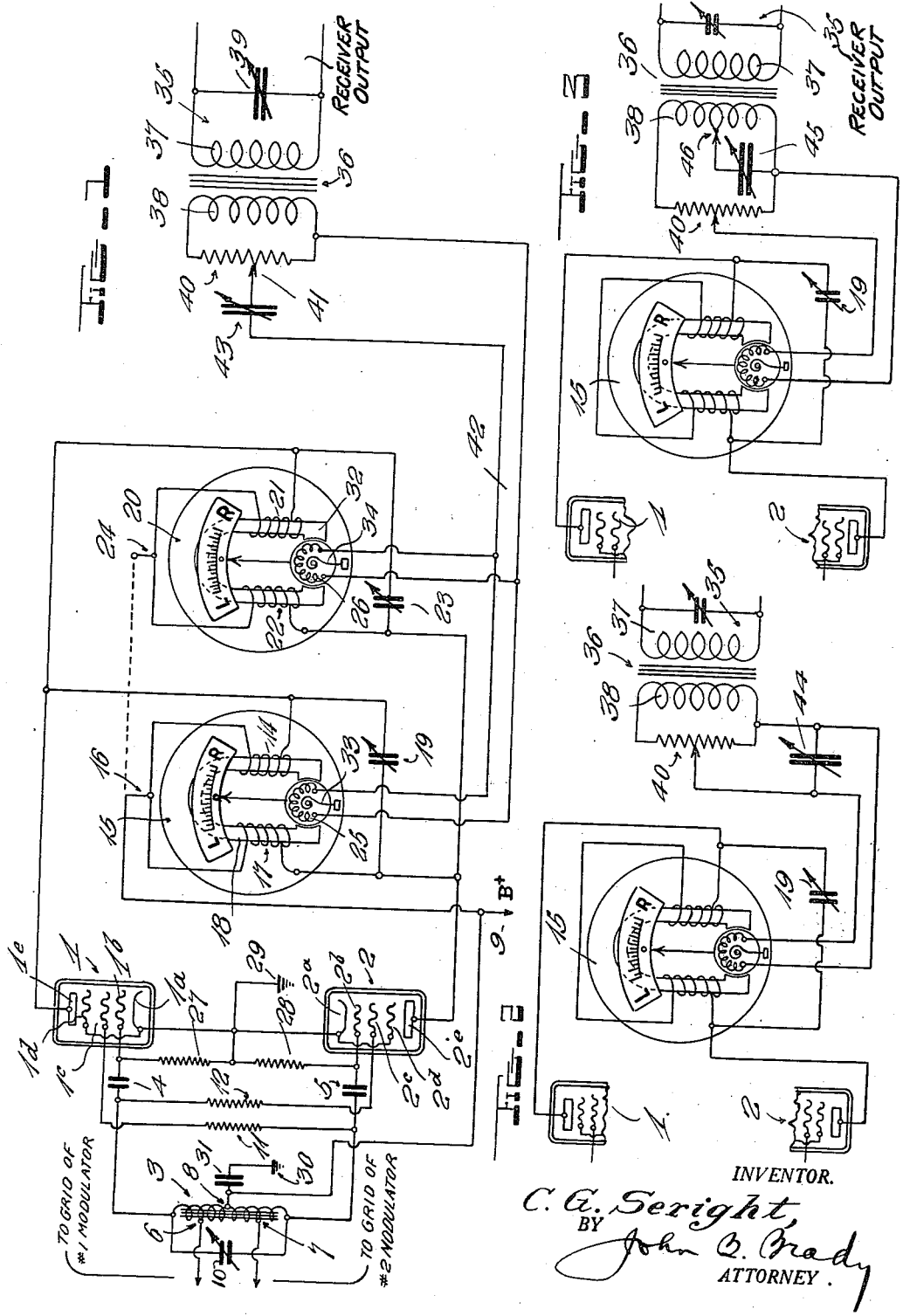
INVENTOR.
C. G. Seright,
BY
John C. Brady
ATTORNEY.

UNITED STATES PATENT OFFICE 2,173,487

SENSITIVE INDICATOR

Carl G. Seright, Dayton, Ohio, assignor to Bendix Radio Corporation, Baltimore, Md., a corporation of Delaware Application July 20, 1936, Serial No. 91,633

2 Claims. (Cl. 171—95)

My invention relates broadly to radio compass systems and more particularly to a circuit arrangement for increasing the effective sensitivity and damping of the dynamometer type of radio compass indicator.

One of the objects of my invention is to provide a means for controlling the phase relationship of the operating currents in the field and armature circuits of the dynamometer type of radio compass indicator for increasing the effective sensitivity and damping thereof.

Another object of my invention is to provide a circuit arrangement for the field and armature circuits of a visual indicator of the dynamometer type in radio compass systems in which the phase angle lead in the armature circuit is controlled by introducing a predetermined capacity in a suitable position in the armature circuit for obtaining a condition of optimum sensitivity and damping in operation of the indicator.

Still another object of my invention is to provide a circuit arrangement for a dynamometer type of visual indicator, having a field winding excited from a modulation generator, and an armature winding excited from the output of a signal receiving circuit with means for controlling the phase relationship of the currents induced in the armature circuit by the field flux with respect to the currents in the field circuit for insuring a condition of optimum sensitivity and damping during the operation of the visual indicator.

Other and further objects of my invention reside in the circuit arrangement for controlling the operation of a dynamometer type of radio compass visual indicator as set forth more fully in the specification hereinafter following, by reference to the accompanying drawing, in which:

Figure 1 diagrammatically and schematically illustrates one form of radio compass visual indicator circuit embodying by invention; Fig. 2 shows a modified form of armature circuit for the visual indicator system of my invention; and Fig. 3 shows a further modified arrangement for the armature circuit in the indicator system of my invention.

The dynamometer indicator consists in part of a field winding in a magnetic circuit including an annular air gap, and an armature coil supported on pivots in the air gap and provided with springs tending to maintain the armature in the position where it has zero magnetic coupling to the field, this being the normal position of rest indicated by zero on the instrument dial.

If an alternating voltage is impressed on the field, and a voltage of like frequency and suitable phase relationship is also impressed on the armature, a turning force is imparted to the armature. The direction of the torque is a function of the relationship of the phases of the field and armature fluxes. If the armature polarity is reversed with respect to the field polarity, the direction of the torque is reversed.

For any armature position except the zero-coupling position, a voltage due to the field flux is induced into the armature circuit. This voltage is a function of the rate of change of current in the field coil and will be 90° out of phase with the field current.

If the impedance of the armature coil circuit is resistive, there will be no resultant torque but if the impedance is reactive there will be a torque. If the reactance is negative (capacitative) the torque will oppose the springs, if positive (inductive) the torque will aid the springs tending to restore the pointer to the center position.

Since the resultant torque opposes the springs when the armature circuit impedance is negative, it follows that a point may be reached where, by increasing the field current and the phase angle lead of the current in the armature circuit by making the reactance more capacitative, the torque due to this induced current will exceed that of the springs, and the indicator pointer will assume its greatest deflection the moment its equilibrium in the center position is disturbed, without the aid of any signal induced in the armature circuit by any source external to the indicator.

For some lower value of field flux and/or armature circuit phase angle lead, the armature will return to the zero position in the absence of a sustained external voltage of field supply frequency being impressed on the armature circuit. The maximum usable sensitivity is therefore obtained when:

1. The highest available field voltage is used, and;
2. The armature circuit phase angle lead is just short of the value that produces a field induction torque equal to the restoring torque of the springs.

In addition, the dynamometer compass meter contains a motional resistance or damping device to oppose erratic movement of the armature when transient voltages are applied to the armature circuit. The efficacy of the damper is directly proportional to the motional resistance of the damper, and inversely proportional to the torque necessary to produce a given deflection of the armature, which is to say inversely proportional to the effective restoring torque of the springs.

It has been shown above that the effective restoring torque of the springs can be reduced by introducing a phase angle lead in the armature circuit. The optimum meter sensitivity is obtained when the field induction torque resulting from an armature circuit phase angle lead almost equals the spring restoring torque. For any particular value of field flux, the condition for optimum sensitivity therefore also provides the greatest damping obtainable with that value of field flux, as explained in the preceding paragraph.

The necessary armature circuit phase angle lead is obtained by connecting a condenser of suitable value 1. In series with the armature.
2. In parallel with the armature, or
3. Across any portion or all of any or all windings of transformers or impedances used to couple the armature to its external source of operating voltage.

Referring to the drawing in more detail, I have illustrated the modulation generators which connect with the field circuit of the visual indicators of the radio compass system as being constituted by pentode tubes 1 and 2. The pentodes 1 and 2, respectively, include the cathode 1a, control grid 1b, shield grid 1c, suppressor grid 1d, and anode 1e; cathode 2a, control grid 2b, shield grid 2c, suppressor grid 2d, and anode 2e. The inductance 3 is connected at opposite ends with the control grids 1b and 2b through condensers 4 and 5. The inductance 3 is tapped, as indicated at 6 and 7, for supplying the low frequency energy to the modulator grids of the modulator tubes in the radio compass circuit. Midtap connection 8 is provided on the inductance 3 and connected with the source of positive potential indicated generally at 9. The midtap 8 is grounded at 30 through a condenser as shown at 31. Condenser 10 serves as a tuning means for the inductance 3 in the push-pull oscillator circuit. Grid leaks 27 and 28 are connected with ground 29 and to the respective control grids 1b and 2b as shown.

The feed-back coupling for the push-pull type of oscillator is obtained by the connection through resistor 11 of shield grid 1c to that side of coil 3 which is connected to control grid 2b. Likewise, shield grid 2c is connected through resistor 12 to that side of coil 3 which is connected to control grid 1b; the resistors 11 and 12 constituting a conductive path through coil 3 and center tap 8 to the source of potential 9, and the shield grids 1c and 2c constituting the anodes of the oscillator system.

It will be seen that the oscillator system is confined to the circuit including the cathode 1a, control grid 1b, and shield grid 1c of tube 1, and cathode 2a, control grid 2b, and shield grid 2c of tube 2, so that low frequency energy may be drawn from the oscillator by connection to the anodes 1e and 2e. This connection avoids any tendency of change in frequency of the oscillator under influence of change in load in the indicator circuits, so that the system of my invention is particularly adapted for using two or more indicators without impairing the precision operation of the compass. The anode current is supplied to anode 1e from the source of potential 9 and to coil 14 of indicator 15 through connection 16. Likewise, the anode current to anode 2e of tube 2 is supplied from the same source through connection 16 and coil 17 of indicator 15. Coils 14 and 17 are so connected that the flux in the magnetic circuit 18 of indicator 15 is proportional to the difference between the currents in coils 14 and 17.

Inspection will reveal that the potential impressed on control grid 1b of tube 1 will be the opposite polarity from that potential impressed on control grid 2b of tube 2 at the same instant. It is thus apparent that the anode current in tube 1 will increase at the same instant when the anode current of tube 2 is decreasing, and vice versa in accordance with the frequency of the oscillatory circuit as determined by the characteristics of coil 3 and condenser 10. There will, therefore, be in the magnetic circuit 18 an alternating magnetic flux corresponding to the frequency of the oscillator.

I prefer to tune coils 14 and 17 to the frequency of the oscillator by means of condenser 19. This provides the optimum power factor for the circuit constituted by coils 14 and 17 and condenser 19, provides that larger currents of the desired frequency shall flow in these coils, and provides a reduction in the magnitude of undesired currents of harmonic frequencies of the oscillator.

Where it is desirable to repeat the indication on other visual indicators, I arranged the additional indicators as shown for example by indicator 20 similar in all respects to indicator 15 having actuating coils 21 and 22 connected to anodes 1e and 2e respectively and associated with tuning condenser 23. Connection 24 which corresponds to the similar connection 16 of indicator 15, may or may not be connected to the source of potential 9. The magnetic circuit 32 of indicator 20 is similar to the magnetic circuit 18 of indicator 15.

The indicators 15 and 20 are of the dynamometer type and each have a movable armature carrying a winding 25 or 26. The windings 25 and 26 are connected in parallel and connected to the output of the amplifier of the receiver. The normal position of windings 25 and 26 is such that the pointers of indicators 15 and 20 remain in the center of their respective scales in the absence of current in coils 25 and 26, under the influence of sets of spiral springs 33 and 34 connected to opposite ends of the pivot shafts of the pointers. Spiral spring 33, mounted in indicator 15, serves to exert a continuous restoring torque on the pointer of indicator 15, as the indicator 15 is displaced either to the left or to the right. In indicator 20, the spiral spring 34 tends to exert a restoring force on the pointer of indicator 20, as the indicator 20 is moved either to the right or the left. The deflection of the pointers of indicators 15 and 20 will, therefore, be in direction and magnitude proportional to the vector product of the currents in actuating coils 14 and 17 and moving coil 25 of indicator 15, and in actuating coils 21 and 22 and moving coil 26 of indicator 20.

Inasmuch as the current in coils 25 and 26 is proportional in magnitude to and controlled in polarity by the signal impressed on the radio compass coil, which in turn is proportional in magnitude to and controlled in polarity by the deviation of the angle of the plane of the radio compass coil from a plane normal to a line to the source of the received signal, it follows that the magnitude of the deflection of indicators 15 and 20 will be a function of the angle of deviation of the radio compass coil from the line to the source of the received signal, and that the direction of said deflection will be a function of the direction of the deviation of said compass coil from said line to said source of received signal. The arrangement of the visual indicators is such that changes in condition of load will not influence the constancy of the oscillator frequency. The condensers 19 and 23 serve to independently tune the associated windings 14 and 17 of indicator 15 and windings 21 and 22 of indicator 20.

In order to secure a proper armature circuit phase angle lead and consequent field induction torque of the desired magnitude and direction, I provide in the circuit associated with the armature, phase determining means. I have indicated the output of the non-directional receiver of the radio compass receiver terminating at circuit 35, including coupling transformer 36, having primary winding 37 coupled to secondary winding 38. Condenser 39 connects across primary winding 37, rendering the output circuit from the receiver selective to the particular tone frequency of the signal, which is the frequency of the modulation generators 1 and 2. The secondary winding 38 is shunted by potentiometer 40, having an adjustable tap 41 thereon for determining the amplitude of the signal energy supplied to the armature circuit 42. For purposes of adjusting the phase of the current induced in the armature circuit by the field, I introduce, as shown in Figure 1, a condenser 43 of suitable value in series with the armature circuit.

As illustrated in Fig. 2, I may connect the condenser as shown at 44 in parallel with the armature circuit.

As illustrated in Fig. 3, I may connect the condenser in the position illustrated at 45, that is, across a portion of the secondary winding 38 between tap 46 and one end of the secondary winding 38 as shown.

In all instances the condensers 43 or 44 or 45 are selected of such value that the degree of phase angle lead introduced in the armature circuit provides optimum meter sensitivity and damping, i. e., provides a field induction torque almost equal to the restoring torque of the springs.

While I have described my invention in certain of its preferred embodiments, I am aware that changes in circuit arrangement may be made and I accordingly desire that it be understood that modifications may be made and I intend no limitations upon my invention other than may be imposed by the scope of the appended claims.

What I claim as new and desire to secure by Letters Patent of the United States is as follows:

1. A visual indicator of the dynamometer type comprising a magnetic circuit, an angularly movable armature disposed in said magnetic circuit, spring means for normally maintaining said armature in a predetermined position, a field winding associated with said magnetic circuit, an armature winding carried by said armature, means for impressing a single exciting current on said field winding, said current being oscillatory at a fixed frequency, means for impressing signal currents on said armature winding, and a capacitative reactance connected in series with said armature winding for introducing a phase angle lead of the current induced therein by the field with respect to the field current.

2. A visual indicator of the dynamometer type comprising a magnetic circuit, an angularly movable armature disposed in said magnetic circuit, spring means for normally maintaining said armature in a predetermined position, a field winding associated with said magnetic circuit, an armature winding carried by said armature, means for impressing a single exciting current on said field winding, said current being oscillatory at a fixed frequency, means for impressing signal currents on said armature winding, and a capacitative reactance connected in circuit with said armature winding for introducing a phase angle lead of the current induced therein by the field with respect to the field current.

CARL G. SERIGHT.